(12) United States Patent
Trown et al.

(10) Patent No.: US 12,517,954 B1
(45) Date of Patent: Jan. 6, 2026

(54) GENERATIVE ARTIFICIAL INTELLIGENCE MODEL STREAMING

(71) Applicant: Amazon Technologies, Inc., Seattle, WA (US)

(72) Inventors: Nicolas Trown, Pleasanton, CA (US); Aditya Venkat Subramanyan, San Jose, CA (US); Duan Duc Tran, Los Gatos, CA (US); Luis Paolo Fernandez, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/611,572

(22) Filed: Mar. 20, 2024

(51) Int. Cl.
  *G06F 16/00* (2019.01)
  *G06F 16/903* (2019.01)

(52) U.S. Cl.
  CPC .............................. *G06F 16/90335* (2019.01)

(58) Field of Classification Search
  CPC ...... G06F 40/40; G06F 40/30; G06F 16/3329; G06F 40/20; G06F 40/205; G06F 40/174; G06F 16/345; G06F 40/186; G06F 16/248; G06F 16/90332; G06F 16/93; G06F 40/134; G06F 40/166; G06F 40/169; G06F 40/197; G06F 21/31; G06F 16/9562; G06F 16/2455; G06F 16/24578; G06F 16/3334; G06F 16/3347; G06F 16/90344; G06F 16/9535; G06F 16/9536; H04L 51/02; H04L 51/48; G06N 5/022; G06N 5/047
  See application file for complete search history.

(56) References Cited

U.S. PATENT DOCUMENTS

| | | | |
|---|---|---|---|
| 12,231,380 B1 * | 2/2025 | Rodgers | H04L 51/02 |
| 2025/0110618 A1 * | 4/2025 | Kumar | G06F 40/30 |

* cited by examiner

*Primary Examiner* — Shyue Jiunn Hwa
(74) *Attorney, Agent, or Firm* — Knobbe, Martens, Olson & Bear, LLP

(57) ABSTRACT

An artificial intelligence system includes one or more generative artificial intelligence models ("generative model") and a retrieval system. The artificial intelligence ("AI") system receives a natural language input query. The retrieval system retrieves data objects associated with the input query. A generative model streams content in response to input query. The AI system formats output from the generative model and the data objects into formatted data. A user interface outputs the formatted data.

20 Claims, 11 Drawing Sheets best microprocessor — 302

When selecting a microprocessor there are several factors to consider. Look for microprocessors based on power efficiency, interfaces, and peripherals needed. Other questions to consider include: Do you need to future-proof the design? What are the expected types of processing tasks for the system? This can affect the number of cores and maximum clock speed for the microprocessor. — 306D

ABZ Semiconductor...
☆☆☆☆☆ 12,354
$4,151 ²³

Top of the line semiconductor ... — 308

( How do I install a microprocessor? ) — 310

FIG. 3E

GENERATIVE ARTIFICIAL INTELLIGENCE MODEL STREAMING

BACKGROUND

A generative artificial intelligence system can include a generative artificial intelligence model ("generative model"). Some generative models, such as large language models ("LLMs"), generate responses to requests or prompts. An LLM can be an artificial neural network that follows a transformer architecture. LLMs can achieve general-purpose language understanding and generation. LLMs can achieve these capabilities via machine learning statistical relationships from text documents during a computationally intensive self-supervised and/or semi-supervised training process. LLMs can be used for text generation by taking an input text and repeatedly predicting the next token or word. A chatbot is a software application that is designed to mimic human conversation through text or voice interactions. Chatbots can use generative artificial intelligence ("AI") systems that are capable of maintaining a conversation with a user in natural language. Some chatbots output only text.

At inference time, some generative models generate responses token by token until the entire response is generated and then the entire response is returned. As the size of generative models increase, the time required to generate the tokens can increase. In a user interface context, the output from the generative model cannot be presented in a user interface until the model completes generating the entire response.

Some generative models can be trained to output data in a data format. For some generative models, the output data format can be a markup format, such as an Extensible Markup Language (XML) format and/or a HyperText Markup Language (HTML) format. As described herein, the output data in the data format can be presented in a user interface. The output in the data format is a string of characters. In the case of a markup format syntax, the string of characters is divided into markup and content. In most cases, strings that constitute markup begin and end with tags. Strings of characters that are not markup are content. Generally, the syntax rules for different output data formats are strict. If the generative model outputs data in the data format with a syntax error, then the user interface either presents an error or cannot present the output.

BRIEF DESCRIPTION OF THE DRAWINGS

FIGS. 3A-3E depict example user interfaces presented on a user computing device referenced in the network environment depicted in FIG. 1.

DETAILED DESCRIPTION

Figure 1:
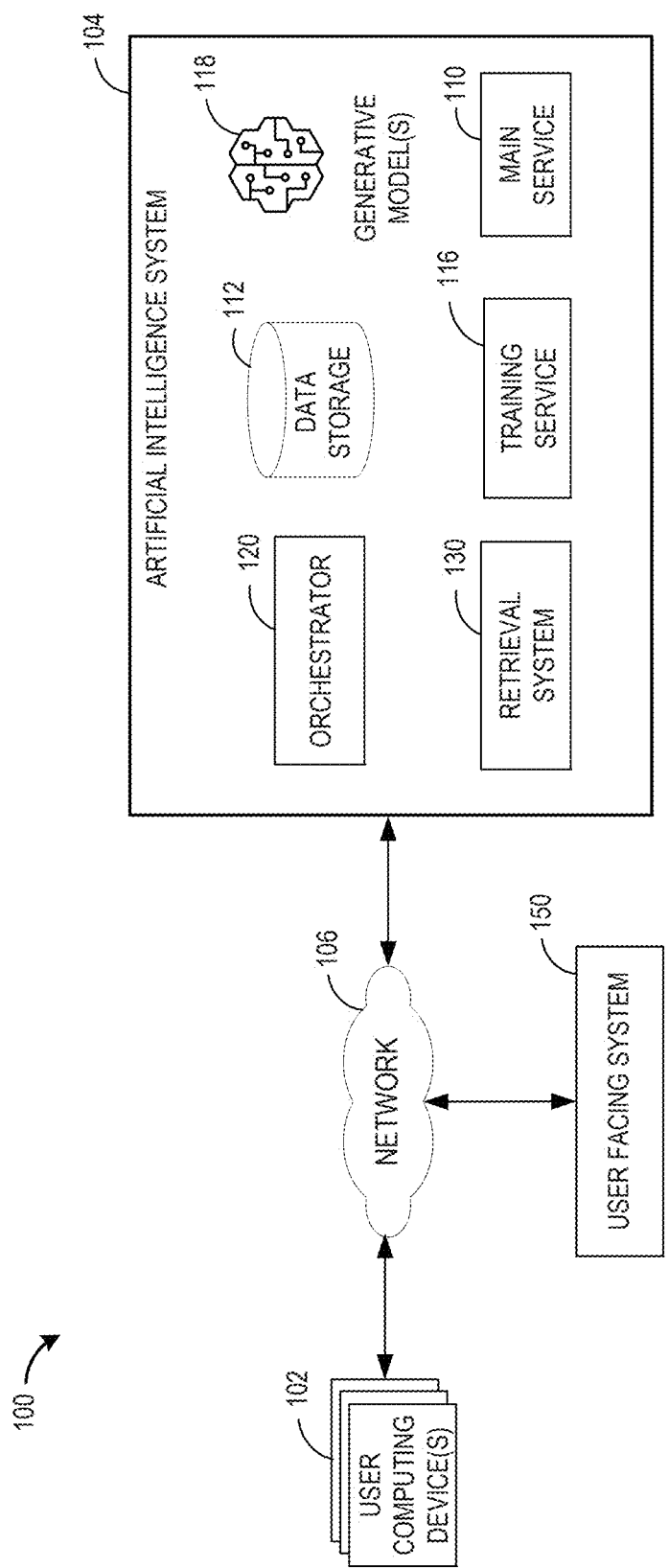
FIG. 1 is a schematic block diagram depicting an illustrative network environment including an AI system that efficiently streams and/or inserts data into generated output.

As described above, some existing generative AI systems generate responses to natural language inputs token by token until the entire response is generated. Generative AI systems can be used to implement a chatbot. Also as described above, generative AI systems can include generative models. As the size of generative models increase, the time required to generate the entire response (such as twenty to thirty seconds) may be an unacceptable amount of time for a variety of reasons, such as keeping a user waiting for a response too long and causing a poor user experience. Some existing generative AI systems generate only text responses. Some user interfaces on a user computing device are configured to receive output from generative AI systems in a particular data format, such as a markup format. It can be difficult for some generative models to generate the output in a particular data format without errors or with few errors. Generative AI systems can also have other limitations. The output from generative models may be limited to information obtained at training time and may be unsuitable for certain kinds of output. For example, existing generative models may be unable to make item recommendations from an electronic catalog based on current availability and/or may be unable to make an item recommendation for a new item that was added to an electronic catalog after the generative model was trained.

Generally described, aspects of the present disclosure are directed to systems and methods for streaming generated output and/or for inserting data into generated output. The AI systems described herein can be used in a chatbot and/or AI assistant context. As described herein, many existing generative models are incapable of reliably recommending items (such as recommending items from a database that are currently available and/or that were added to the database after the model was trained). In some embodiments, the systems and methods described herein can address these technical deficiencies. The AI system may include a retrieval system to retrieve data objects associated with an input query. Advantageously, since the AI system retrieves the associated data objects retrieved from databases, the output content is less susceptible to hallucination risk. As described herein, some existing generative AI systems will wait for an entire response to be generated until presenting any output. However, the improved AI systems described herein can stream output such that a user computing device can output content before a complete response has been generated. The AI systems can include one or more generative models. A generative model can receive the input query, the one or more retrieved data objects, and/or context. The AI system can process the output from the generative model. Moreover, in some aspects, the output from the generative model can be augmented with previously retrieved data objects. In some embodiments, the AI system can be configured to stream response content following receiving an input query, e.g., via a user interface, thereby improving the user experience. Moreover, the generative model can be trained to output intermediate tokens, which can use fewer computing resources to generate and/or be less susceptible to hallucination risk. The generative AI system can format output from the generative model and/or the retrieval system into formatted data. The user interface can output data based on the formatted data.

As used herein, the term "intermediate token" can refer to text data that is easier predict than another token. A token can refer to text that a generative model reads or generates. Tokens can include characters, parts of words, a word, and/or a phrase. "ITEM-LIST" can be an intermediate token that serves as a placeholder that can be converted into final text, such as, but not limited to, "<section type='item-list' heading=' '>". In some embodiments, a generative model can more reliably predict "ITEM-LIST" (i.e., with less hallucinations) and/or with fewer computing resources than other text such as "<section type='item-list' heading=' '>".

As used herein, the term "data object" can refer to a data container for information. A data object may be associated with a number of definable properties. A data object may represent a specific thing, or a group of things, in the world. For example, a data object may represent an item such as a particular product, service, review, question, or other noun. A data object may represent a document or other unstructured data source such as an e-mail message. Each data object may be associated with a unique identifier that uniquely identifies the data object.

Turning to FIG. 1, an illustrative network environment 100 including an AI system 104 that can generate an AI-based response to a natural language input query. The components of the network environment 100 can enable efficient streaming of generated output (such as the output of a generative model) with fewer computing resources and/or fewer errors. As described herein, existing approaches for AI-generated response content can be computationally intensive and/or significantly error prone. The components of the network environment 100 can further enable a training pipeline and an inference pipeline, which enable efficient determination of responses to natural language input queries. The network environment 100 may include one or more user computing devices 102, a user facing system 150, and an AI system 104. The AI system 104 may include an orchestrator 120, a retrieval system 130, a main service 110, a training service 116, a data storage 112, and one or more generative models 118.

In some embodiments, the user facing system 150 (with which a user computing device 102 may interact) can include an electronic catalog system. The electronic catalog system can store items. The electronic catalog system may include or be in communication with a data store of information about items that may be listed for sale, lease, etc. by an electronic marketplace, sellers, merchants and/or other users. The item information in this data store may be viewable by end users through a browsable or searchable electronic catalog in which each item may be described in association with a network page, such as an item detail page, describing the item. Each item detail page may include, for example, item image(s) and description, customer ratings, customer and professional reviews, sales rank data, lists of related items, and/or other types of supplemental data that may assist consumers in making informed acquisition decisions. The user facing system 150 can provide a network page that enables users to interact with items, such as selecting, acquiring, and/or consuming items (such as watching or playing a media content item), where available. Users of the system may, in some embodiments, locate specific item detail pages within the electronic catalog by executing search queries, navigating a browse tree, and/or using various other navigation techniques. An item can refer to a data object that can represent a specific thing that has one or more definable attributes. For example, an item can represent things such as, but not limited to, a physical product. Each item can be associated with an item identifier, such as, "A02939RMZC" or "A03ALIDEYW".

The user facing system 150 can be the system that interfaces with the user computing devices 102. In some embodiments, via the user facing system 150 and a user interface, a user can provide one or more natural language input queries and can receive automated responses to their queries. Queries can include, but not limited to, item seeking questions (such as "best microprocessor" or "I want to go camping in Utah. What do I need?"), general world knowledge questions (such as "What is Moore's Law?"), navigation questions (such as help with order status, frequently asked questions, etc.), and/or requests for reviews, item summaries, or item comparisons. User computing devices 102 can include, but are not limited to, a laptop or tablet computer, personal computer, personal digital assistant (PDA), hybrid PDA/mobile phone, smart wearable device (such as a smart watch), mobile phone, a smartphone, a smart speaker, and/or a virtual reality device. In some embodiments, the user computing device 102 can be installed with an application that communicates with the user facing system 150. In some embodiments, the user facing system 150 can provide input, such as the natural language input query, to the AI system 104.

Before receiving natural language input queries, the AI system 104 can train the one or more generative models 118. In some embodiments, the AI system 104 can receive a pre-trained model. In some embodiments, the AI system 104 can retrieve the pre-trained model from a third party. The pre-trained model can be a generative model, such as, but not limited to, a foundational LLM. The foundational LLM can come in different sizes. Each foundational LLM can be trained on billions or trillions of tokens and can have billions of parameters. The LLM can take a sequence of words as an input and predict a next word to recursively generate text. The LLM can be trained from text from languages with the most speakers (such as text from 10 or 20 languages with the most speakers) and can focus on languages with particular types of alphabets (such as Latin and Cyrillic alphabets). Since the generative model can be trained with documents in multiple languages, the generative model can be multilingual.

In the AI system 104, the training service 116 can retrain (which can include fine-tuning) a pre-trained model with training data. As described herein, the AI system 104 can retrieve the pre-trained model from a third party. Fine-tuning can refer to an approach to transfer learning where the weights of the pre-trained model are trained on new data. Fine-tuning can be performed on the entire neural network or on only a subset of its layers, in which case the layers that are not being fine-tuned remain the same. In some embodiments, during fine-tuning, the learning rate for training can be lowered. The training data can include text in a particular context, such as text associated with the electronic catalog context. The training text can include communications between users and agents, such as, but not limited to, transcripts via chat or calls and/or email communications. Training by the training service 116 can result int the generative model(s) 118. In some embodiments, the training service 116 can train one generative model 118 (which can be referred to herein as a query planner model) to receive a query and output a query plan. The training service 116 can train another generative model 118 (which can be referred to herein as a response generator model) to receive the query, data objects, and/or additional data, and output an intermediate response. As described herein, the generative model 118, such as a response generator model, can be trained to output intermediate tokens, which can refer to text data that is easier predict than other tokens. In some embodiments, the generative model 118, such as a response generator model, can be trained to output intermediate tokens with training data that includes the intermediate tokens, such as prompt and response pairs with intermediate tokens. The generative models 118 and/or the training data can be stored in the data storage 112.

At inference time (which occurs a time after the generative models 118 have been trained), the orchestrator 120 can receive an input query. In some embodiments, the orchestrator 120 can receive the input query via the user facing system 150. In some embodiments, the orchestrator 120 can retrieve a query plan based at least in part on the query and a generative model 118 such as a query planner model. As described herein, the query plans can include one or more retrieval sources, which can instruct the retrieval system 130 where to retrieve data objects. The orchestrator 120 can provide the query plan and the input query to the main service 110. The main service 110 can receive one or more data objects responsive to the input query via the retrieval system 130. In some embodiments, the main service 110 can retrieve data objects responsive to the input query via the retrieval system 130 with the query plan. Each data object can be associated with an object identifier. The main service 110 can determine input from the input query and the data object(s). The main service 110 can provide the input to another generative model 118, such as a response generator model. In some embodiments, the main service 110 can apply the query and the data object(s) to the response generator model. The response generator model can stream output data, such as output text data, to a stream handler, which can be responsible for processing the stream output data into an output data format. The stream handler can also be responsible for converting intermediate tokens into the output data format and/or for inserting additional data into the stream output data using the retrieved data objects. The main service 110 can stream the formatted output data to a client application associated with the user computing device 102. The client application can determine when to output portions of the formatted output data. In some embodiments, the AI system 104 can call an Application Programming Interface (API) to a generative AI service instead of invoking a local generative model to receive generated content.

The data storage 112 may be embodied in hard disk drives, solid state memories, or any other type of non-transitory computer readable storage medium. The data storage 112 may also be distributed or partitioned across multiple local and/or remote storage devices. The data storage 112 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

The user computing devices 102, the AI system 104, and/or the user facing system 150 may each be embodied in a plurality of devices. Each of the user computing device 102, the AI system 104, and/or the user facing system 150 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program (a.k.a., computer-executable) instructions that the hardware processor executes in order to operate the user computing device 102, the AI system 104, and/or the user facing system 150. The memory generally includes RAM, ROM, and/or other persistent and/or auxiliary non-transitory computer readable storage media.

Additionally, in some embodiments, the AI system 104 and/or the user facing system 150 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
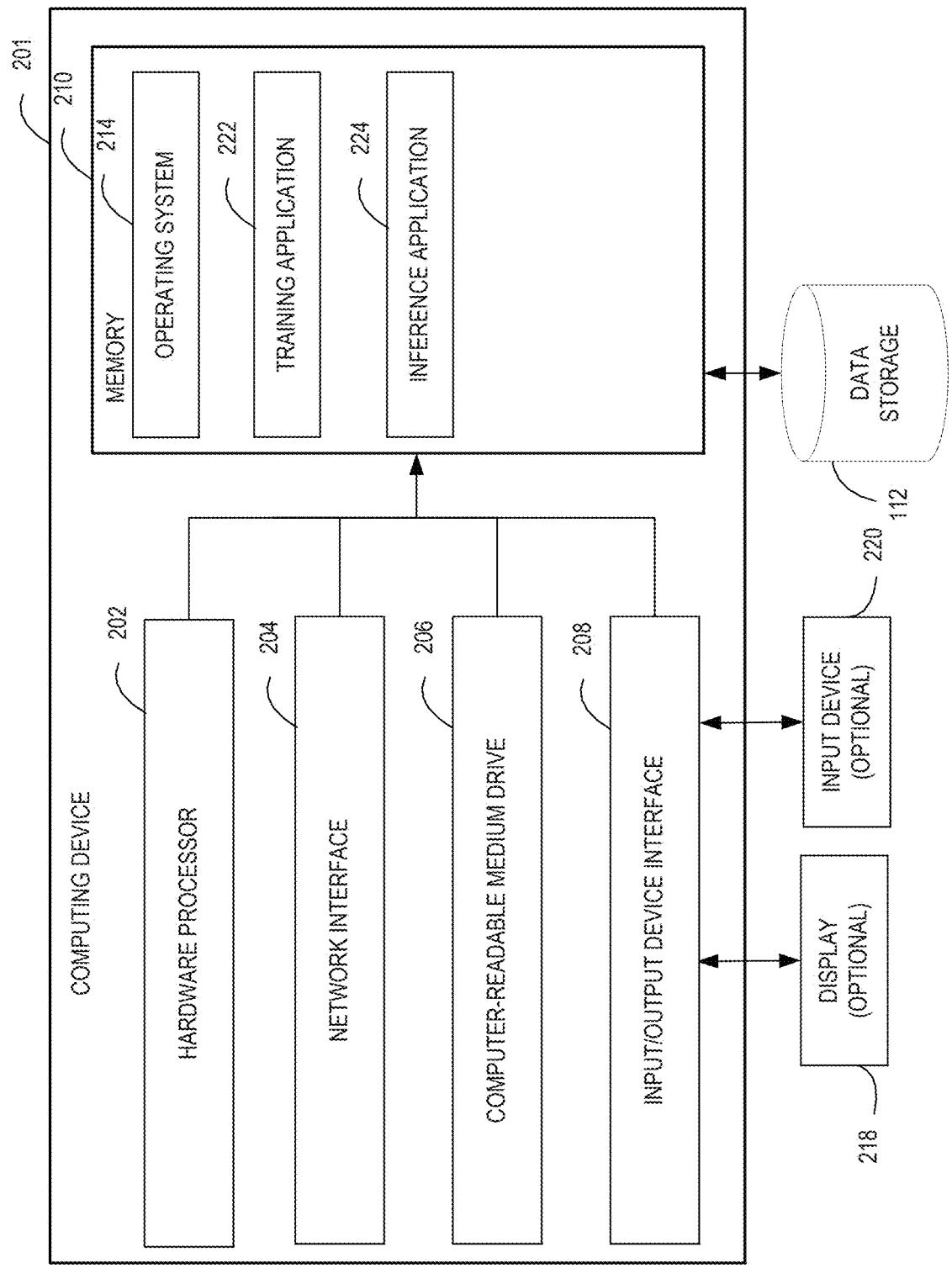
FIG. 2 is a schematic block diagram depicting an illustrative general architecture of a computing device for implementing the AI system referenced in the network environment depicted in FIG. 1.

FIG. 2 is a schematic diagram of an illustrative general architecture of a computing device 201 for implementing the AI system 104 referenced in the environment 100 in FIG. 1. In particular, a computing device 201 can be used to implement the main service 110, the orchestrator 120, the retrieval system 130, and/or the training service 116. The computing device 201 includes an arrangement of computer hardware and software components that may be used to execute the training application 222 and/or the inference application 224. The general architecture of FIG. 2 can be used to implement other devices described herein, such as the user computing device 102 referenced in FIG. 1. The computing device 201 may include more (or fewer) components than those shown in FIG. 2. Further, other computing systems described herein may include similar implementation arrangements of computer hardware and/or software components.

The computing device 201 for implementing an AI system 104 may include a hardware processor 202, a network interface 204, a non-transitory computer-readable medium drive 206, and an input/output device interface 208, all of which may communicate with one another by way of a communication bus. As illustrated, the computing device 201 is associated with, or in communication with, an optional display 218 and an optional input device 220. The network interface 204 may provide the computing device 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the AI system 104. The non-transitory computer-readable medium drive 206 can store the computer program instructions. The memory 210 generally includes RAM, ROM and/or other persistent or non-transitory computer-readable storage media. The memory 210 may store an operating system 214 that provides computer program instructions for use by the hardware processor 202 in the general administration and operation of the device within the AI system 104.

The memory 210 may include a training application 222 and/or an inference application 224 that may be executed by the hardware processor 202. In some embodiments, the training application 222 and/or the inference application 224 may implement various aspects of the present disclosure. In some embodiments, the training application 222 can receive training data; the training application 222 can train and/or retrain machine learning model(s) to predict query plans and/or data used for responses to input queries; the inference application 224 can predict query plans and/or data used for responses to input queries; the inference application 224 can stream formatted output based on the data received from the one or more machine learning models.

FIGS. 3A-3E depict a user interface 300, which can be presented via the user computing device 102. The user interface 300 shown in FIGS. 3A-3E is the same user interface that can be shown at different times in each figure of FIGS. 3A-3E. As described herein, users can have queries and the AI system 104 can respond to the queries with the use of one or more generative models. However, instead of waiting for the AI system 104 to determine the entire response, the user interface 300 can output partial responses from the AI system 104. Moreover, instead of the output being exclusively text output from a generative model, the AI system 104 can retrieve data objects via at least partially non-generative methods and embed metadata for the data objects in the generated response. Accordingly, in some embodiments, it can advantageously be guaranteed that aspects of the output from the user interface 300 will not be hallucinated. Moreover, in some aspects, the systems and methods described herein can enable output of the user interface 300 to have fewer errors.

Figure 3A:
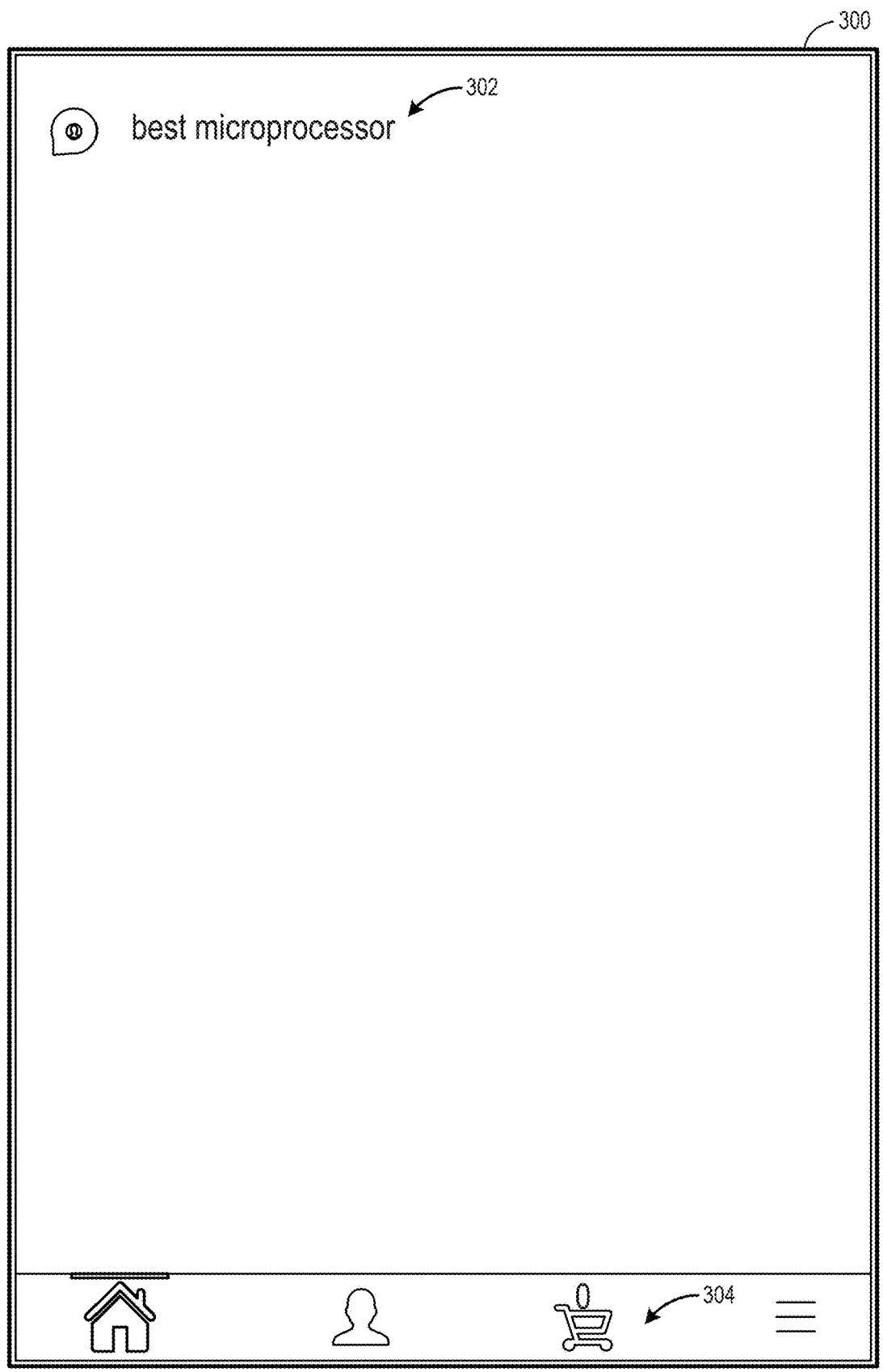

In FIG. 3A, as shown, the user interface 300 can receive an input query 302. The input query 302 can include text data (here "best microprocessor"). A user can input the input query 302 via the user interface 300. Also as shown, the user interface can include user interface elements 304, such as, but not limited to, a home user interface element, a profile user interface element, a cart user interface element, and/or a settings user interface element. As described herein, the user interface 300 can be integrated with an electronic catalog system.

Figure 3B:
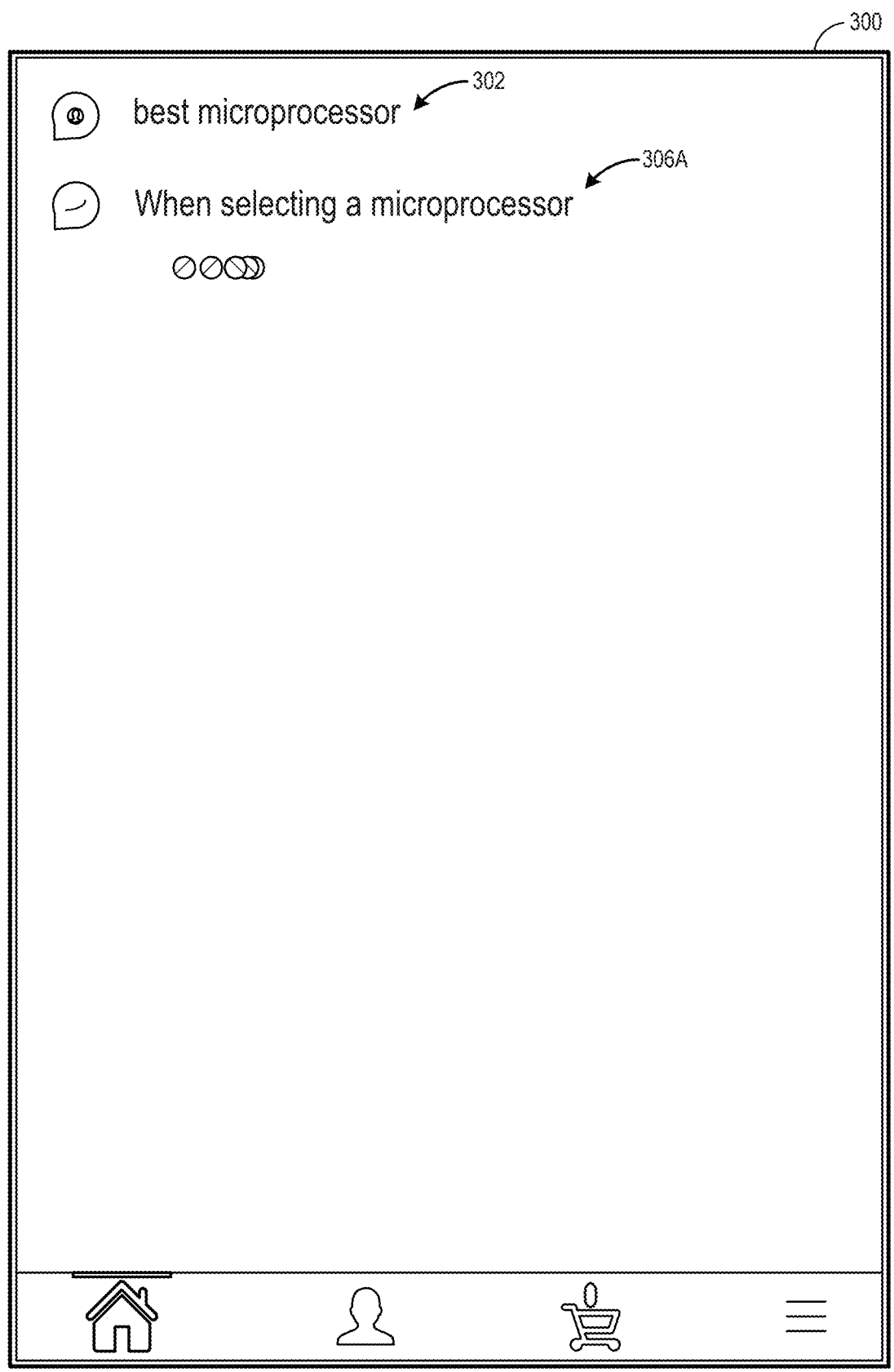

In FIG. 3B, as shown, the user interface 300 can output content 306A in response to the input query 302. The user interface 300 can output the content 306A in response to receiving the input query 302. As described herein, instead of waiting for the entire response to be complete, the AI system 104 can cause the content 306A (which may be incomplete) to be output. As shown, in response to receiving the query 302, "best microprocessor," the user interface 300 can output the automatically generated first text "When selecting a microprocessor" in the content 306A.

Figure 3C:
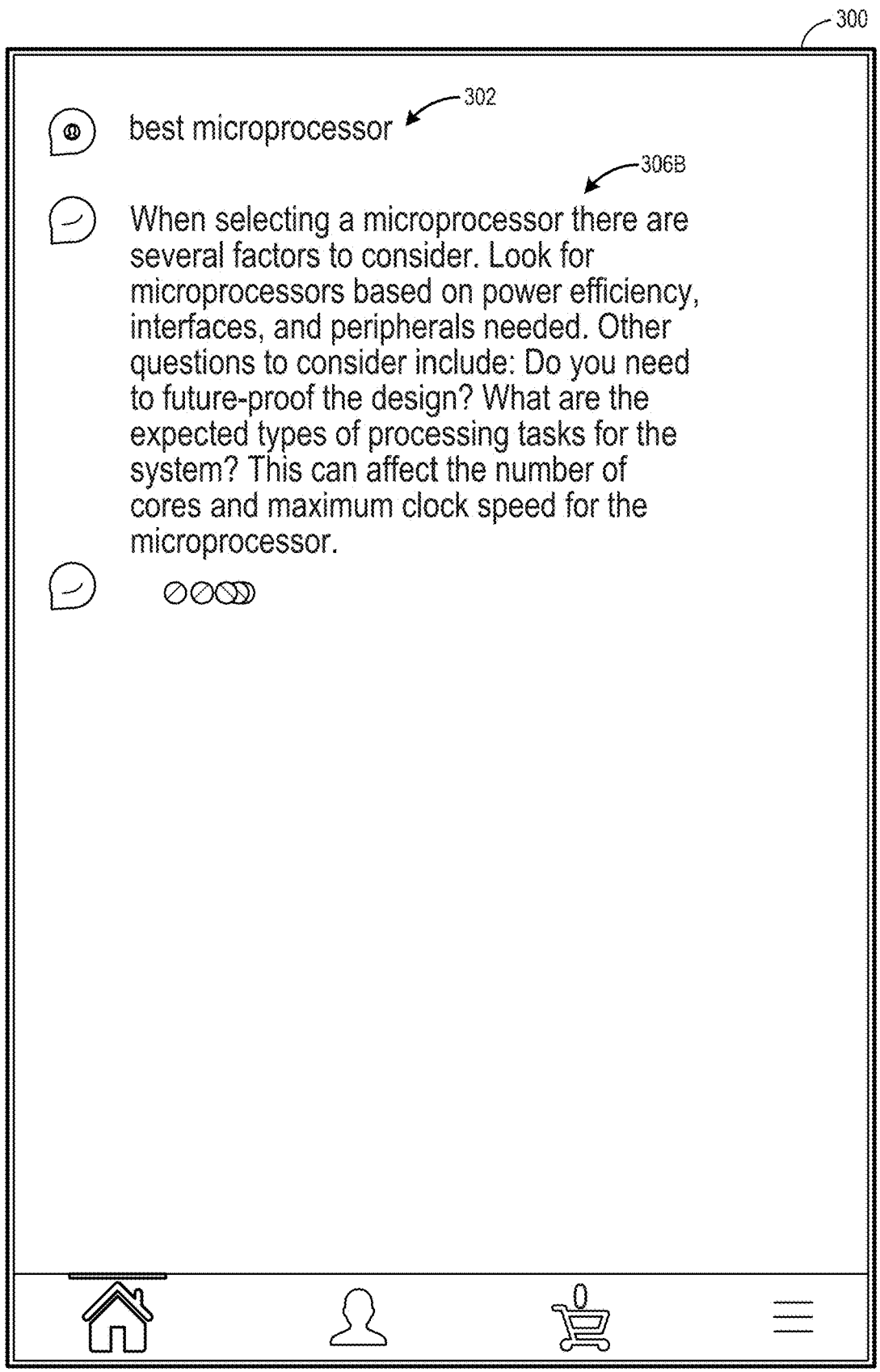

In FIG. 3C, as shown, the user interface 300 can output updated content 306B in response to the input query 302. The user interface 300 can output the content 306B in response to receiving the input query 302. As shown, in response to receiving the query 302, "best microprocessor," the user interface 300 can output the automatically generated second content in the updated content 306B, which can further relate to the input query 302.

Figure 3D:
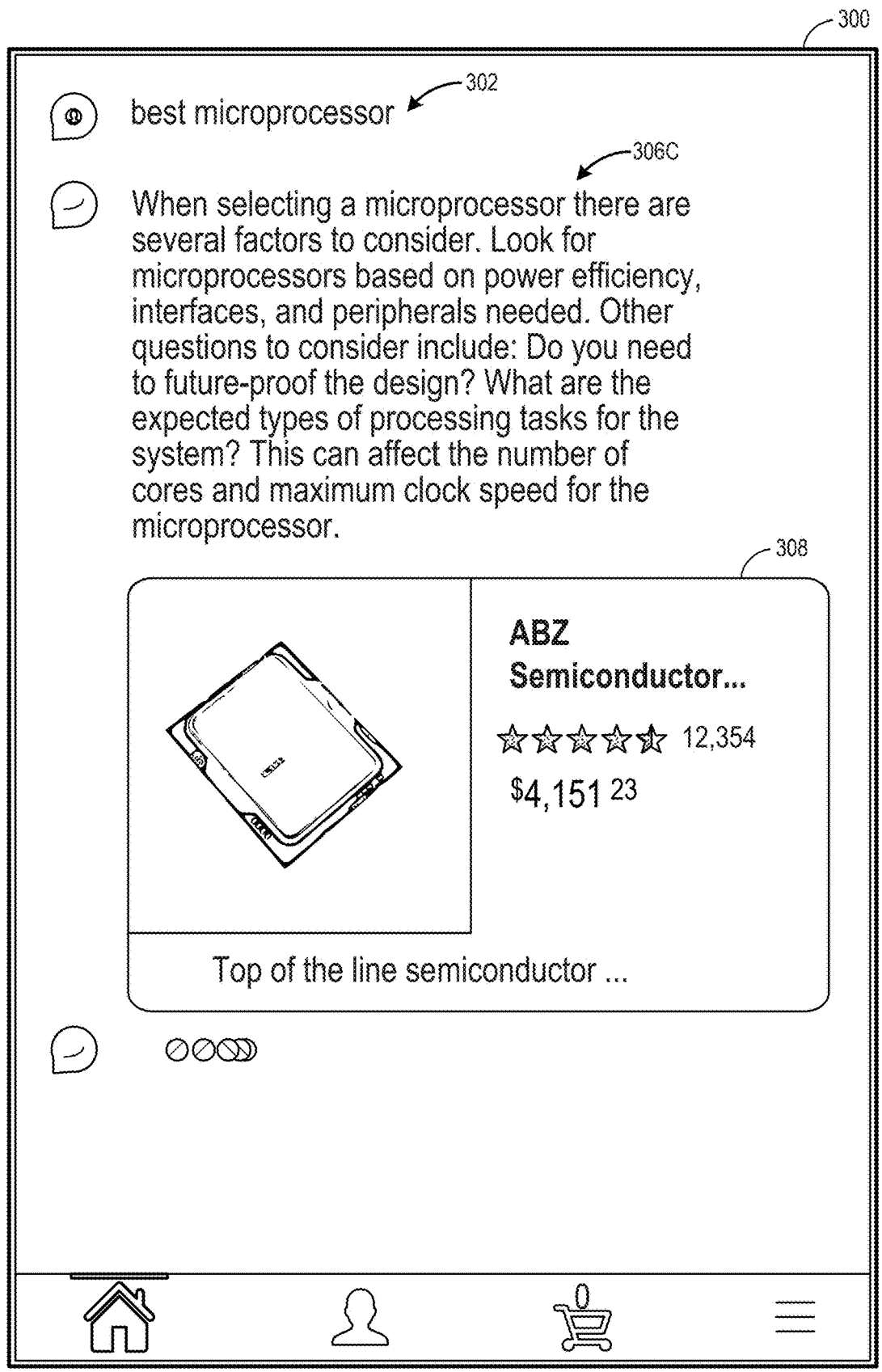

In FIG. 3D, as shown, the user interface 300 can output updated content 306C in response to the input query 302. As shown, in response to receiving the query 302, the user interface 300 can output the automatically determined third content in the updated content 306C, which can further relate to the input query 302. As shown, the updated content 306C can include additional text and an item area 308. The item area 308 can present item metadata, such as, but not limited to, an item title, an item image, a portion of an item description, and/or an item rating. In some embodiments, a user can select the item area 308, which can cause the user interface 300 to present an item detail page.

As described herein, the updated content 306C can illustrate content that existing generative models are unable to output or cannot reliably output. For example, in response to receiving the query 302, the user interface 300 can present an item recommendation. Moreover, the item recommendation shown in the item area 308 can be in a highly structured format (such as in a markup format with an image), which many generative models are unable to provide or cannot reliably output. The item details shown in the item area 308 can be retrieved from a database, and, therefore, there is no hallucination risk.

In FIG. 3E, as shown, the user interface 300 can output updated content 306D in response to the input query 302. As shown, in response to receiving the query 302, the user interface 300 can output a related question element 310 in the updated content 306D, which can further relate to the input query 302. The related question element 310 can be selectable. In some embodiments, if the user selects the related question element 310, a corresponding question (such as "How do I install a microprocessor?") can be automatically populated into the user interface 300 as a new input query. Accordingly, the user interface 300 can then output a new response in response to the new input query.

As described herein, the updated content 306D can illustrate content that existing generative models are unable to output or cannot reliably output. For example, in response to receiving the query 302, the user interface 300 can present a related question from a database. Moreover, the related question element 310 can be in a highly structured format (such as in a markup format), which many generative models are unable to provide or cannot reliably output. The related question can be retrieved from a database, and, therefore, there may be no hallucination risk.

The systems and methods described herein may improve AI technology. As described herein, output from some existing generative models is limited to information obtained at training time and/or are prone to hallucinations. Many LLMs are unable to make item recommendations from an electronic catalog based on current availability and/or are unable to make an item recommendation for a new item that was added to an electronic catalog after the LLM was trained, such as the item presented in the item area 308. In some aspects, the systems and methods described herein can use one or more techniques to improve AI technology. In some embodiments, the system can include a query planner service and/or a retrieval system. The query planner service can, in response to receiving a query from a user computing device, determine a query type and generate a query plan for the retrieval system. The retrieval system can obtain data objects, such as, but not limited to, items related to the query (which could be items from an electronic catalog based on current availability and/or a new item that was recently added to an electronic catalog). In some embodiments, the retrieved data objects also have the benefit of not being hallucinated. After a generative model generates a response to the query with placeholders, a post-processing service can insert the data objects into the generated response. The system can thus determine a response with output previously unavailable to other generative AI systems and with non-hallucinated data objects. Accordingly, the systems and methods described herein may improve AI technology.

The systems and methods described herein may improve the functioning of a computer to generate an AI-based response to a query. Generative models, such as LLMs, take time to generate output. The time a generative model takes to generate output can depend on the size of the generative model and/or the size of the input data. For example, in cases where the generative model generates the entire response before returning any data, some generative models can take twenty to thirty seconds to generate a response. Therefore, the latency for existing generative models and generative AI systems to provide a complete response to a user interface on a user computing device, which can then be output by a user interface, may lead to a relatively poor user experience. In some aspects, the systems and methods described herein can use one or more techniques to allow at least partial output via a user interface. As shown and described in FIGS. 3A-3E, the user interface 300 can output at least partial responses without having to wait for the entire response to be generated. For example, each partial response can take approximately one second or less than one second to be output via the user interface. In some embodiments, the systems and methods described herein allow content from a generative model to be streamed, processed, and output via a user interface without the entire response having been generated, thereby improving user interface technology. Accordingly, streaming model output and processing the model output after receiving a query can lead to an improved user experience where the user does not need to wait for the entire response (such as a wait time of twenty to thirty seconds) before the user interface outputs any content.

Figure 4:
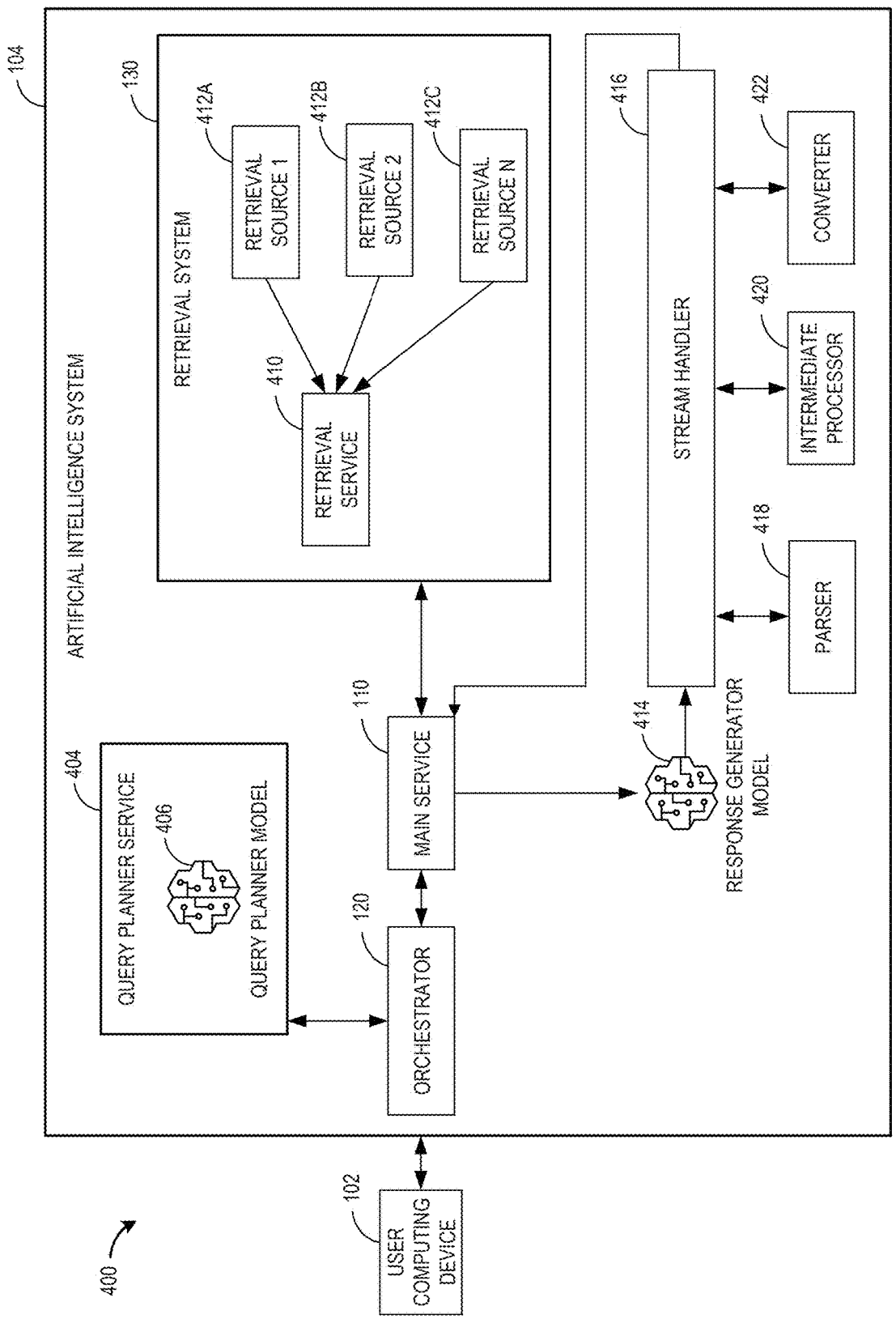
FIG. 4 is a schematic block diagram depicting an environment in which illustrative components of the AI system process input queries received from a user computing device.

FIG. 4 is a schematic block diagram depicting an environment 400 in which illustrative components of an AI system 104 process input queries received from a user computing device 102. As described herein, the components of the AI system 104 can enable efficient streaming of generated output with fewer computing resources. The components of the AI system 104 can further enable an inference pipeline that efficiently determines responses to input queries with fewer errors and/or hallucinations. The environment 400 of FIG. 4 can include the user computing device 102 and the AI system 104. The AI system 104 can include an orchestrator 120, a main service 110, a query planner service 404, a retrieval system 130, a response generator model 414, and/or a stream handler 416.

The user computing device 102 can provide an input query, which can include text data, to the AI system 104, which can include the orchestrator 120. While not shown, there can be other services and/or systems between the AI system 104 and the user computing device 102, such as the user facing system 150. Thus, in some embodiments, the user facing system 150 can receive the input query and provide the input query and/or other input to the AI system 104. The orchestrator 120 can provide the input query to the query planner service 404. The query planner service 404 can include one or more query planner models 406. The input query can be applied to the query planner model 406. The query planner model 406 can be trained to predict a question type based at least in part on the input query. Question types can include, but are not limited to, a factoid question type (such as a question related to world knowledge and/or item seeking), a navigation or help question type (such as help with an order status), a review question type, an item summary question type, and/or an item comparison question type. In some embodiments, the query planner model 406 can receive context, such as, but not limited to, a user session, which can include a communication history (such as the current conversation history in the user interface 300), a current page, a current item (such as the user reviewing a particular item), item metadata (such as a title of an item), and/or a user profile. The query planner service 404 can format the input data into a prompt based at least in part on a prompt template. In some embodiments, the query planner model 406 can predict a query plan and/or rewrite the question. In some embodiments, the query plan can include the retrieval sources 412A, 412B, 412C to be queried. For example, if the input query is "is it easy to install?" the query planner model 406 can return retrieval sources such as a review retrieval source and/or a question retrieval source (such as a community question answers retrieval source).

The orchestrator can send the query and the query plan to the main service 110. The main service 110 can send the query and the query plan to the retrieval system 130. The retrieval system 130 can include a retrieval service 410 and one or more retrieval sources 412A, 412B, 412C. For each retrieval source returned by the query planner service 404, the retrieval system 130 can request data objects from each of the applicable retrieval sources 412A, 412B, 412C. The retrieval sources 412A, 412B, 412C can include, but are not limited to, an item search retrieval source, a review retrieval source, a common questions answers retrieval source, a public data retrieval source (such as a publicly available, crowd-sourced encyclopedia), and/or a multi-modal retrieval source (such as a user-created image and/or video repository). In some embodiments, each of retrieval sources 412A, 412B, 412C can implement a retrieval source interface. The retrieval service 410 can request data objects based at least in part on the input query for each of the identified retrieval sources 412A, 412B, 412C. In some embodiments, instead of searching each retrieval sources 412A, 412B, 412C, the query planner service 404 can identify a subset of retrieval sources that are relevant to the current input query. The data objects can be associated with the input query. Data objects can include, but are not limited to, items, questions, images, videos, and/or reviews that are related to the input query.

The main service 110 can use the input query, the determined question type, the determined data objects, and/or context data to determine input data, such as a prompt. In some embodiments, the main service 110 can use the determined question type to select a corresponding prompt template. The main service 110 can determine a prompt from the input query, the determined question type, the determined data objects, the context data, and/or the prompt template. In some embodiments, the main service 110 can apply a length limit to the prompt and/or a portion of the prompt. The main service 110 can provide input data (such as the prompt) to the response generator model 414.

As described herein, the response generator model 414 can be trained to receive input data (such as a prompt) based at least in part on the query, the data objects, and/or additional data, and output an intermediate response. The intermediate response can include intermediate tokens. The response generator model 414 can stream output data, such as output text data, to the stream handler 416. The stream handler 416 can be responsible for processing the stream output data into an output data format. The stream handler 416 can include a parser 418, an intermediate processor 420, and a converter 422. The parser 418 can receive the stream output data and, where appropriate, can convert intermediate tokens into intermediate tags. For example, the parser 418 can convert an intermediate token, such as "ITEM-LIST," into an intermediate tag, such as "[s type='item-list']". The intermediate processor 420 an apply additional logic to modify the intermediate output, which can include inserting data from retrieved data objects and/or metadata associated with the retrieved data objects. In some embodiments, the intermediate processor 420 can replace placeholders in the intermediate output. For example, the intermediate processor 420 can add item titles, item images, item descriptions, and/or links to related questions. The intermediate processor 420 can remove flagged text, which can be based on fuzzy logic text matching. The converter 422 can receive the modified intermediate output and convert the intermediate tags into the output data format. The output data format, can include, but is not limited to, a markup format and/or an object notation data format (such as a JavaScript Object Notation (JSON) format). As described herein, the response generator model 414 can advantageously output shorter intermediate tokens, which can use fewer computing resources than some existing systems that output full tokens. In some aspects, another advantage of processing intermediate tokens, which can be shorter than tokens in the output data format, is that the post-processing logic can more reliably determine output data format with fewer errors than a fully generative model approach for determining output data in the output data format. In some embodiments, the stream handler 416 can follow an iterator paradigm. Accordingly, the stream handler 416 can iterate through the streamed output from the response generator model 414 to determine portions of output in the output data format in a streamed manner.

The stream handler 416 can cause the response data in the output data format to be streamed to the user computing device 102. The stream handler 416 can transmit data to the main service 110, which in turn can provide the data to the orchestrator 120. In some embodiments, the orchestrator 120 and/or other systems or services (not shown) can enhance the data, such as by adding metadata to the output, such as, but not limited to, data that is determined in response to the input query and/or the output, which could be metadata for an item, for example. In some embodiments, the orchestrator 120 can stream the formatted output data to a client application associated with the user computing device 102. The client application for the user computing device 102 can determine when to output portions of the streamed output data.

Figure 5A:
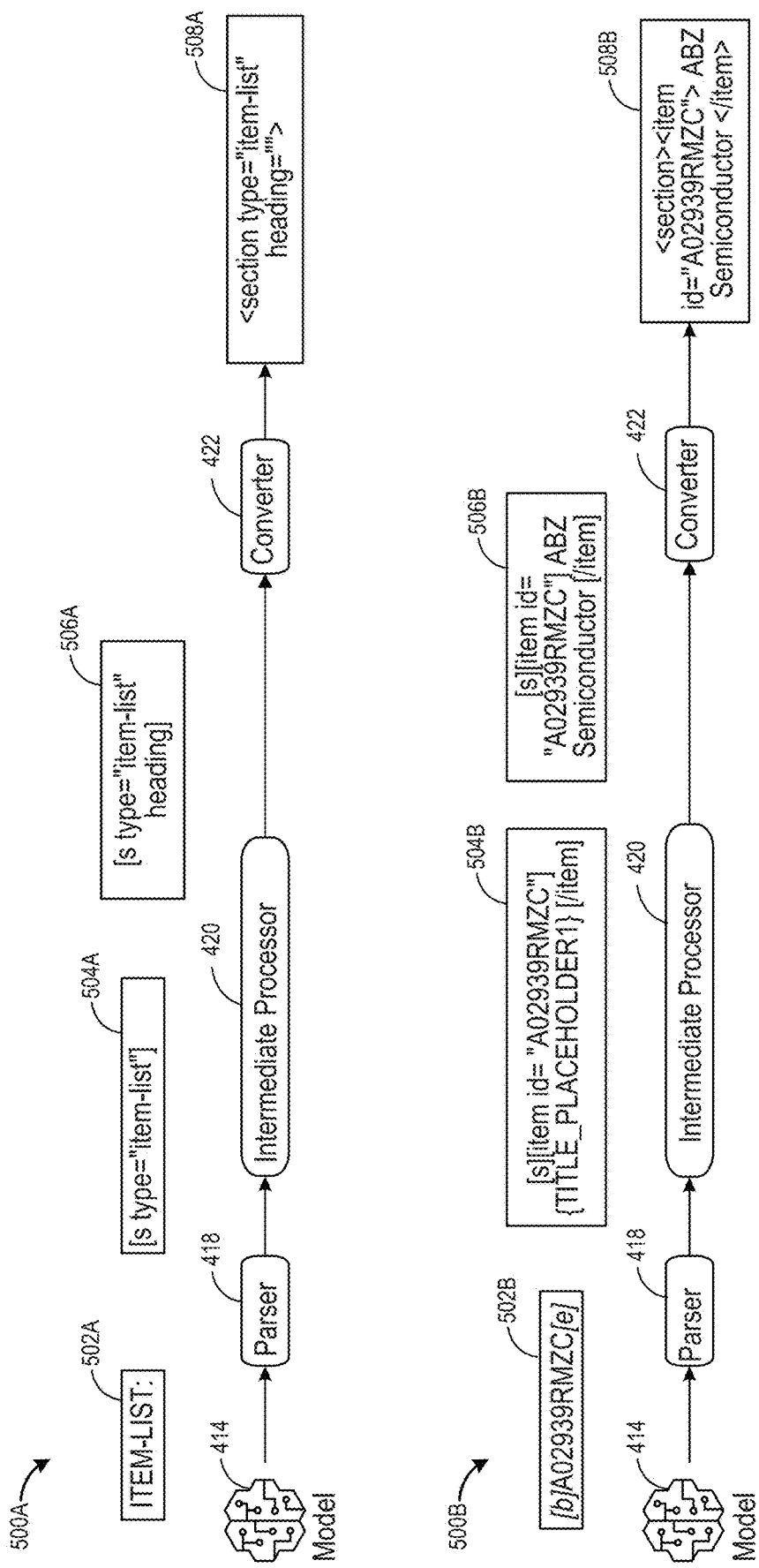
FIGS. 5A-5B are schematic block diagrams depicting post-processing of generated output.
Figure 5B:
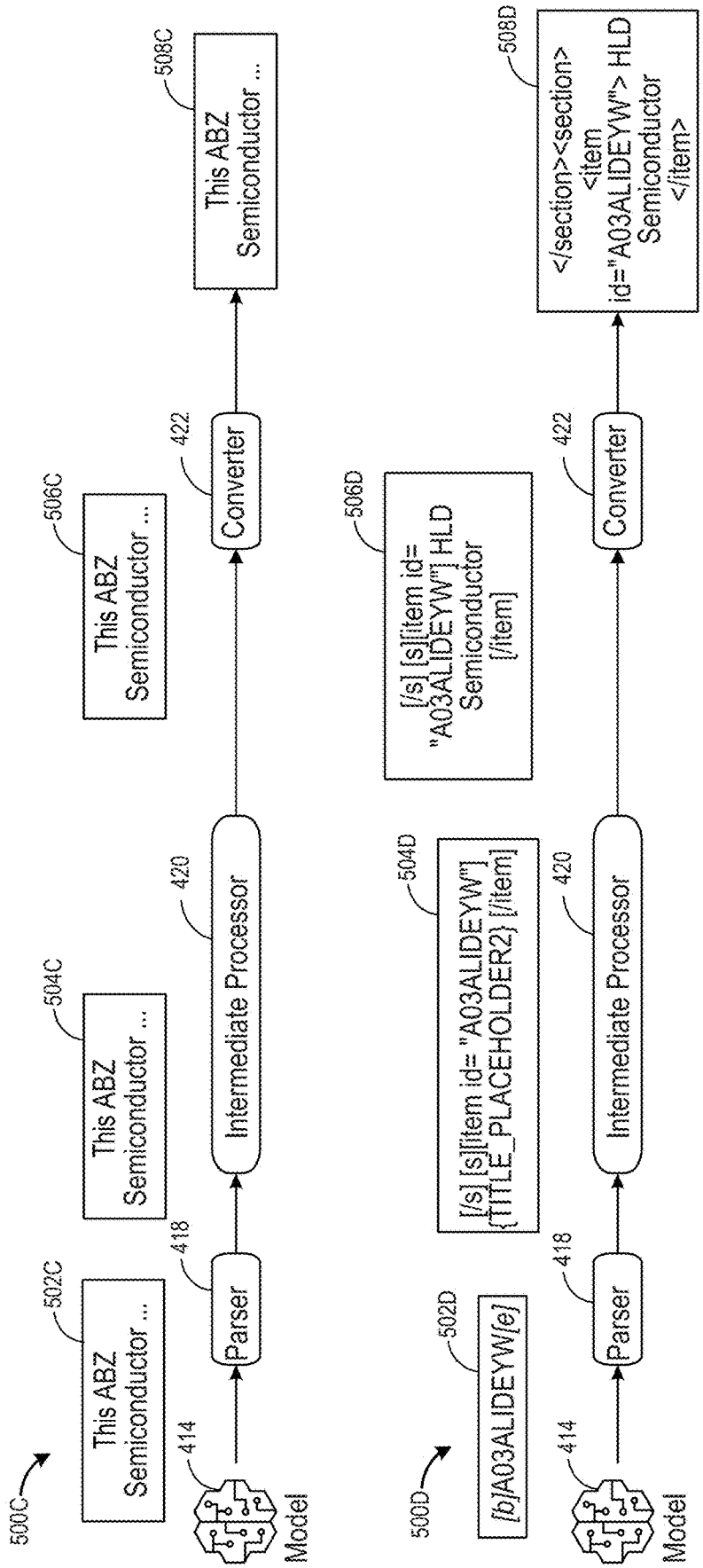

FIGS. 5A-5B are schematic block diagrams depicting post-processing of generated output. As described herein, the operations shown in FIGS. 5A-5B can illustrate how the post-processing of generated output can advantageously use intermediate tokens, which can be shorter than other tokens, which can lead to formatted output data with fewer computing resources and/or that has fewer errors. A user computing device 102 can receive the output shown in FIGS. 5A-5B.

In FIG. 5A, a first portion of streamed content 500A is depicted. As shown, the generative model 414 can output one or more first tokens 502A. The parser 418 can receive the one or more first tokens 502A and convert any intermediate tokens in the first tokens 502A. The parser 418 can include a dictionary to translate intermediate tokens to intermediate tags. As shown, the parser 418 can convert the one or more first tokens 502A (here "ITEM-LIST:") into first intermediate output 504A (here "[s type='item-list']"), which can include one or more intermediate tags and/or placeholders. The intermediate processor 420 can receive the first intermediate output 504A and can convert any intermediate tags and/or placeholders in the first intermediate output 504A. As shown, the intermediate processor 420 can convert the first intermediate output 504A (here "[s type='item-list']") into modified first intermediate output 506A (here "[s type='item-list' heading]". The converter 422 can receive the modified first intermediate output 506A and can convert the output 506A into the output data format. As shown, the converter 422 can convert the modified first intermediate output 506A (here "[s type='item-list' heading]") into the first formatted content 508A (here "<section type='item-list' heading='>"), which can be in a markup format.

In FIG. 5A, a second portion of streamed content 500B is depicted. The second portion of streamed content 500B can be a continuation of the first portion of streamed content 500A. As shown, the generative model 414 can output one or more second tokens 502B. The parser 418 can receive the one or more second tokens 502B and convert any intermediate tokens in the second tokens 502B. As shown, the parser 418 can convert the one or more second tokens 502B (here "[b]-A02939RMZC[e]") into second intermediate output 504B (here "[s][item id='A02939RMZC']{TITLE_PLACEHOLDER1}[/item]"), which can include one or more intermediate tags and/or placeholders. The intermediate processor 420 can receive the second intermediate output 504B and can convert any intermediate tags and/or placeholders in the second intermediate output 504B. As shown, the intermediate processor 420 can convert the second intermediate output 504B (here "[s]I[item id='A02939RMZC']{TITLE_PLACEHOLDER1}[/item]") into modified second intermediate output 506B (here "[s][item id="A02939RMZC" ]ABZ Semiconductor [/item]". The converter 422 can receive the modified second intermediate output 506B and can convert the output 506A into the output data format. As shown, the converter 422 can convert the modified second intermediate output 506B (here "[s][item id='A02939RMZC']ABZ Semiconductor [/item]") into the second formatted content 508B (here "<section><item id='A02939RMZC'>ABZ Semiconductor </item>"), which can be in a markup format.

As shown, the one or more second tokens 502B can include one or more delimiters. As shown, the delimiter can be represented by a beginning delimiter (here "[b]") and an ending delimiter (here "[e]"). A beginning delimiter can include, but is not limited to, a character, such as a new line character "\n". An ending delimiter can include, but is not limited to, another character, such as a colon character ":".

In FIG. 5B, a third portion of streamed content 500C is depicted. The third portion of streamed content 500C can be a continuation of the second portion of streamed content 500B of FIG. 5A. As shown, the generative model 414 can output one or more third tokens 502C. The parser 418 can receive the one or more third tokens 502C. As shown, in some cases, the parser 418, the intermediate processor 420, and/or the converter 422 may not make any changes to the content. For example, the one or more third tokens 502C may not include any intermediate tokens, placeholders, and/or may not contain any flagged content. Accordingly, each of the parser 418, the intermediate processor 420, and/or the converter 422 can output respective content 504C, 506C, 508C without any changes. In this case, the output content 508C can be a description of the item with the identifier "A02939RMZC".

In FIG. 5B, a fourth portion of streamed content 500D is depicted. The fourth portion of streamed content 500D can be a continuation of the third portion of streamed content 500C. As shown, the generative model 414 can output one or more fourth tokens 502D. The parser 418 can receive the one or more fourth tokens 502D and convert any intermediate tokens in the fourth tokens 502D. As shown, the parser 418 can convert the one or more fourth tokens 502D (here "[b]A03ALIDEYW[e]") into fourth intermediate output 504D (here "[s][item id='A03ALIDEYW'] {TITLE_PLACEHOLDER2}[/item]"), which can include one or more intermediate tags and/or placeholders. The intermediate processor 420 can receive the fourth intermediate output 504D and can convert any intermediate tags and/or placeholders in the fourth intermediate output 504D. As shown, the intermediate processor 420 can convert the fourth intermediate output 504D (here "[s][item id='A03ALIDEYW']{TITLE_PLACEHOLDER2} [/item]") into modified fourth intermediate output 506D (here "[s][item id='A03ALIDEYW']HLD Semiconductor [/item]". The converter 422 can receive the modified fourth intermediate output 506D and can convert the output 506D into the output data format. As shown, the converter 422 can convert the modified fourth intermediate output 506D (here "[s][item id='A03ALIDEYW']HLD Semiconductor [/item]") into the fourth formatted content 508D (here "</section><section><item id='A03ALIDEYW'>HLD Semiconductor </item>"), which can be in a markup format.

The systems and methods described herein may improve the functioning of a computer to generate AI-based highly structured data. As described herein, such as with respect to FIGS. 5A-5B, a user computing device 102 can receive data in an output format that is highly structured, such as, but not limited to, a markup format or an object notation format. Some existing generative models can be trained to output data in the output format. In the context of a markup format, sample output can include "<section type='item-list' heading='>", which can include tags and attributes. However, due to model hallucinations, some existing generative models may be prone to emitting errors in the syntax of the output format. For example, there can be syntax errors in the output tags and/or attributes. In some aspects, the systems and methods described herein can use one or more techniques to improve the functioning of a computer to generate AI-based structured data with fewer errors. As described herein, the techniques can include, but are not limited to, configuring generative models to generate output with special, intermediate tokens. In some embodiments, the generative model can be trained to output "ITEM-LIST" as an intermediate token (which can be predicted with fewer errors) and a subsequent translation layer can convert the intermediate token into valid output with correct syntax. Accordingly, the systems and methods described herein may improve the functioning of a computer to generate AI-based output with fewer syntax errors.

The systems and methods described herein may improve the functioning of a computer to generate an AI-based response to a query. As described herein, generative models, such as LLMs, take time to generate output. The time a generative model takes to generate output can depend on the size of the generative model and/or the size of the input data. For example, in cases where the generative model generates the entire response before returning any data, some generative models can take twenty to thirty seconds to generate a response. In some aspects, the systems and methods described herein can use one or more techniques to improve computer performance for an AI generated response to a query. The techniques can include, but are not limited to, configuring generative models to generate output in a special format with fewer tokens, streaming model output, and processing the model output after receiving a query. For example, if a generative model takes a threshold period of time to generate each token (such as twenty milliseconds), the generative model is used to generate markup, and the entire response must be generated before any data is returned, then the generative model may have relatively poor performance for any of the foregoing reasons. As described herein, such as with respect to FIGS. 5A-5B, many output formats can have many syntax elements (such a markup format with markup tags, attributes, and other very specific elements). Using a generative model to generate these syntax elements can use significant computing resources. Therefore, using a generative model to generate output in a special format with fewer tokens can improve the performance of a computer and take less time to output at least a portion of a response. For example, if the generative model can output fewer tokens, such as twenty percent fewer tokens, the generative model can execute approximately twenty percent faster. Accordingly, the systems and methods described herein may improve computer performance and use fewer computing resources. As used herein, the term "computing resource" can refer to a physical or virtual component of limited availability within a computer system. Computing resources can include, but are not limited to, computer processors, processor cycles, and/or memory.

Figure 6:
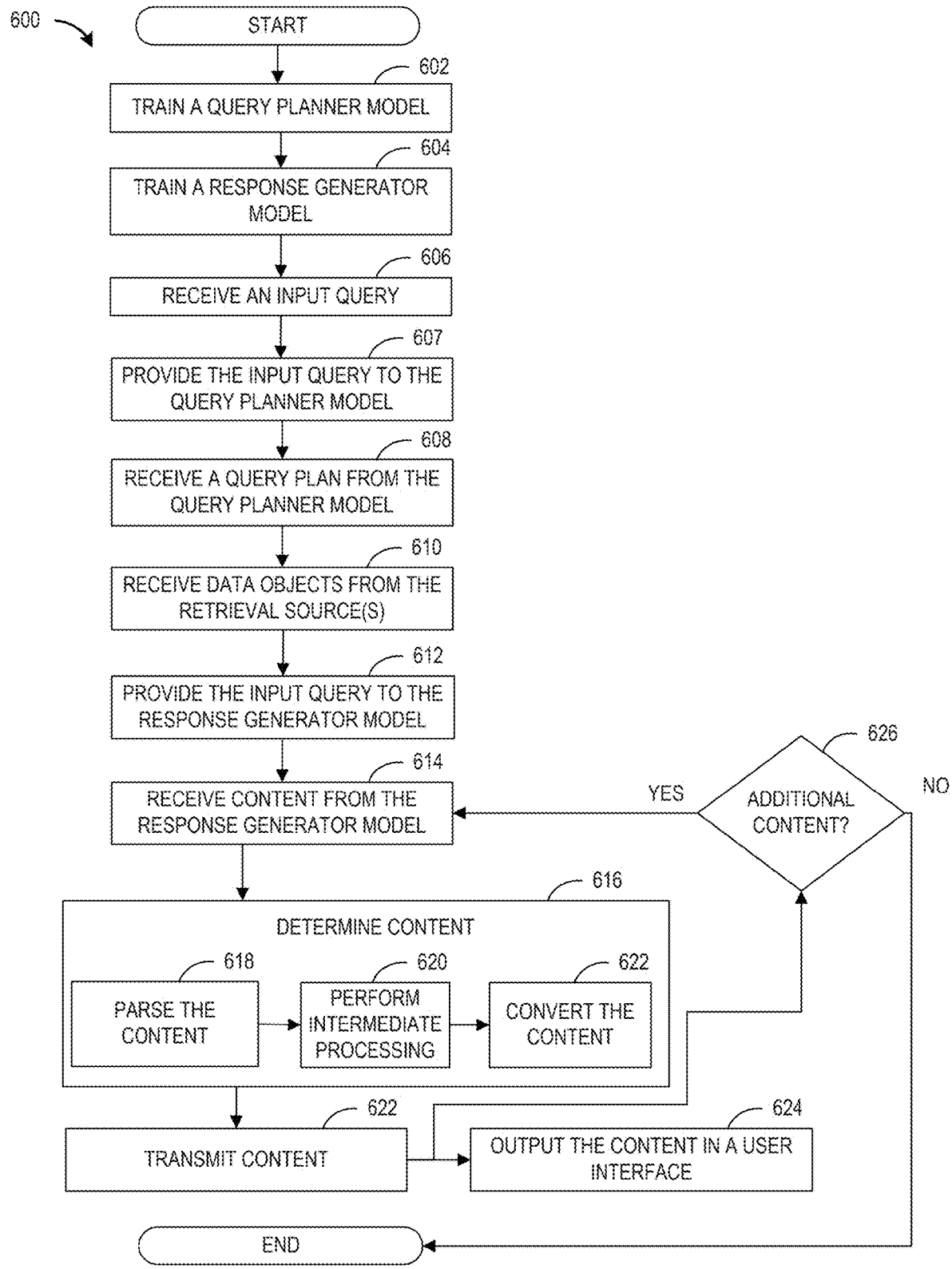
FIG. 6 is a flow chart depicting a method implemented by the AI system for efficiently generating content in response to an input query.

FIG. 6 includes a flow chart depicting a computer-implemented method 600 for efficiently determining content in response to an input query. The method 600 can enable streaming of generated output with fewer computing resources and/or fewer errors than other approaches. As described herein, the method 600 can also determine content that would be difficult for many existing generative models to accomplish. The determined content can advantageously be used within a chat and/or an AI assistant context. As described herein, the AI system 104, which includes the main service 110 and the training service 116, may be implemented with the computing device 201 of FIG. 2. In some embodiments, the computing device 201 may include the training application 222 and/or the inference application 224, each of which may implement aspects of the method 600. Accordingly, the computing device 201 can implement aspects of the method 600. Moreover, some aspects of the method 600 may be described above with respect to FIGS. 3A, 3B, 3C, 3D, 3E, 4, 5A, 5B.

Beginning at block 602, a query planner model can be trained. The training service 116 can train a query planner model with training data. In some embodiments, the training service 116 can retrain (which can include fine-tuning) a pre-trained model. The training service 116 can train the query planner model to predict a question type based at least in part on an input query. As described herein, question types can include, but are not limited to, a factoid question type (such as a question related to world knowledge and/or item seeking), a navigation or help question type (such as help with an order status), a review question type, an item summary question type, and/or an item comparison question type. In some embodiments, the training service 116 can train the query planner model with context, such as, but not limited to, a user session, which can include a communication history (such as the current conversation history in the user interface 300), a page, an item, the item title, and/or a user profile. The training service 116 can train a query planner model offline before any inference requests are received.

For a query planner model, the training service 116 can retrain a pre-trained language model with machine learning and a training data set that includes prompt and response pairs. The training service 116 can output a trained generative model. The prompts in the training data set can include, but is not limited to, input queries. The responses in the training data set can include question types and query plans. The query plans can include one or more retrieval sources. As new retrieval sources are added, the training service 116 can re-train a pre-trained model with training data sets that include a new retrieval source. In an example, the training data set can include the input query "best microprocessor" in a prompt. For the prompt with "best microprocessor," the training data set can include a corresponding response with a question type of a factoid question type and one or more retrieval sources, such as, an item search retrieval source, a review retrieval source, and/or a common questions answers retrieval source. The training data set can further include text in a particular context, such as text documents associated with an electronic catalog context.

At block 604, a generative model can be trained, which can be referred to herein as the response generator model. The training service 116 can train a generative model with training data. In some embodiments, the training service 116 can retrain (which can include fine-tuning) a pre-trained model. The training service 116 can train the generative model to predict a content based at least in part on an input query, a question type, retrieved data objects, and/or metadata regarding retrieved data objects. In some embodiments, the training service 116 can train the generative model with context, such as, but not limited to, a user session, which can include a communication history (such as the current conversation history in the user interface 300), a page, an item, the item title, and/or a user profile. The training service 116 can train a generative model offline before any inference requests are received.

For a response generator model, the training service 116 can retrain a pre-trained language model with machine learning and a training data set that includes prompt and response pairs. The training service 116 can output a trained generative model. The training service 116 can retrain a pre-trained language model with machine learning and a training data set including a prompt and response pair, where the prompt and response pair include an intermediate token. The prompts in the training data set can include input queries, question types, retrieved data objects, and/or metadata regarding retrieved data objects. The responses in the training data set can include content responsive to the input queries, which can include intermediate tokens. In an example, the training data set can include the input query "best microprocessor" in a prompt. For the prompt with "best microprocessor," the training data set can include corresponding response content with descriptive text such as "When selecting a microprocessor there are several factors to consider. Look for microprocessors based on power efficiency, interfaces, and peripherals needed. Other questions to consider include: Do you need to future-proof the design? What are the expected types of processing tasks for the system? This can affect the number of cores and maximum clock speed for the microprocessor." The training data set can further include text intermediate tokens shown in the following text: "ITEM-LIST[b]A02939RMZC[e]The ABZ Semiconductor offers groundbreaking performance.[b] A03ALIDEYW[e]". Non-limiting intermediate tokens can be "ITEM-LIST" and the delimiters that the generative model is trained to predict. If new intermediate tokens are added, the generative model can be retrained with new intermediate tokens.

In some embodiments, the training service 116 can train multiple machine learning models for different domains. For either or both the query planner and/or the response generator models, the training service 116 can train a different machine learning model for different question types. For example, a machine learning model can be trained for factoids, another machine learning model can be trained for navigation or help questions, another machine learning model can be trained for item comparisons, and so forth.

At block 606, an input query can be received. The AI system 104 can receive the input query. The AI system 104 can receive the input query from a user computing device 102. The input query can include text data. In some embodiments, the AI system 104 or another system can receive audio data and convert the audio data into text data with natural language processing. The input query can be a question in a chat and/or an AI assistant context. For example, the question can relate to world knowledge, assistance with finding an item, help with an order status, information about an item, information about reviews for an item, and/or comparisons between items. The input query can be received via a user interface. Additional details regarding user interfaces that can receive input queries are described herein, such as with respect to FIG. 3A-3E. As described herein, in some embodiments, the user interface can include or be a voice-based user interface, where input and output via the user interface can be audio. In some embodiments, the orchestrator 120 can determine a user profile associated with the input query. The orchestrator 120 can determine a communication history and/or a navigation history associated with the user profile.

At block 607, the input query can be provided to the query planner model, which can be referred to as a trained generative model. The orchestrator 120 can provide the input query to the query planner model. The orchestrator 120 can determine input data, such as a prompt based at least in part on the input query. In some embodiments, the orchestrator 120 can determine input data via feature extraction and the features can be provided to the query planner model. The orchestrator 120 can provide the input data, such as the prompt, to the query planner model. In some embodiments, the query planner model can receive context, such as, but not limited to, a user session, which can include a communication history, a current page, a current item (such as the user reviewing a particular item), item metadata (such as a title of an item), and/or a user profile. The orchestrator 120 can further determine input data based at least in part on the communication history and/or the navigation history. The orchestrator 120 can further determine the prompt by inserting the communication history and/or the navigation history and at least some of the input query into a prompt template. The orchestrator 120 can insert other context into the prompt template. As described herein, the context can include, but is not limited to, a user session, which can include a communication history (such as the current conversation history in the user interface 300), a navigation history, a current page, a current item (such as the user reviewing a particular item), item metadata (such as a title of an item), taxonomy information (such as item category, sub-category, etc.), and/or a user profile.

At block 608, a query plan can be received from the query planner model. The main service 110 can receive a query plan from the query planner model or an intermediate service. The query plan can include the retrieval source(s) (from multiple retrieval sources) predicted to be associated with the input query. The query planner model may not select some retrieval sources based at least in part on input data (such as a prompt), which can result in reduced computing resource usage since those excluded retrieval sources may not need to be used for a particular input query. As described herein, the retrieval sources can include, but are not limited to, an item search retrieval source, a review retrieval source, a common questions answers retrieval source, a public data retrieval source (such as a publicly available, crowd-sourced encyclopedia), and/or a multi-modal retrieval source (such as a user-created image and/or video repository). The main service 110 can also receive a question type from the query planner model. In some embodiments, the query planner model can predict a re-written question based at least in part on the input query.

At block 610, data objects can be received from the retrieval source(s). The main service 110 can receive data objects from the retrieval system 130. The main service 110 can receive data objects (such as items, related questions, and/or item reviews) from retrieval sources based at least in part on the input query. In the retrieval system 130, the retrieval service 410 can retrieve data objects from the identified retrieval sources based at least in part on the input query. The retrieval system 130 can retrieve data objects that are difficult for traditional generative models to provide. For example, an item search retrieval source can retrieve items that are currently available and/or that were added to an electronic catalog after a generative model was trained. Data objects can include, but are not limited to, items, reviews, common questions, etc. Items can be associated with and/or include metadata, such as titles, descriptions, images, and/or resource locators for images (such as Uniform Resource Locators). For example, if the input query (such as "best microprocessor"), then a first retrieval source (such as an item search retrieval source) can return items related to the input query (such as different microprocessor items), a second retrieval source (such as a review retrieval source) can return reviews related to the input query (such as different reviews for microprocessors), a third retrieval source (such as a common questions answers retrieval source) can return questions related to the input query (such as common questions for microprocessors), and so on. The main service 110 can determine metadata for data objects (such as item metadata for an item).

The retrieval source(s) 412A, 412B, 412C can retrieve data objects using dense retrieval, sparse retrieval, and/or making application programming interface (API) calls. A retrieval source with a dense retrieval approach can encode an input query into an embedding and can retrieve the top-K data objects most similar to the input query. The retrieval source can encode the input query into an embedding; provide the embedding to a trained neural network, where the trained neural network identifies a data object based at least in part on the embedding; and provide the data object to the main service 110. A retrieval source with a sparse retrieval approach can use keyword(s) determined from the input query and use the keyword(s) to retrieve data objects associated with (such as containing the keywords). The retrieval source can determine a keyword based at least in part on the input query; identify, from a plurality of data objects, a data object matching the keyword; and provide the data object to the main service 110. The retrieval source can match a keyword with a data object if metadata and/or properties for the data object match, where matching can include exact and/or fuzzy text matches. In some embodiments, a retrieval source can identify data objects with an index. The retrieval source can determine an identifier based at least in part on the input query; identify, from an index, a data object associated with the identifier; and provide the data object to the main service 110. In some embodiments, a retrieval source can include an online component and an offline component. In a dense retrieval source, the offline component can determine and use an index over the data object corpus, and the online component runs a neural network search to get top-K most relevant evidence. Similarly for a sparse retrieval source, the offline component can determine and use an index over the data object corpus, and the online component can perform a keyword based lookup.

At block 612, the input query can be provided to a trained generative model, which can be referred to as a response generator model. The main service 110 can provide the input query to the trained generative model. The main service 110 can determine input data, such as a prompt, based at least in part on the input query and/or the question type. In some embodiments, the main service 110 can determine input data via feature extraction and the features can be provided to the trained generative model. In some embodiments, the main service 110 can select a prompt template from multiple prompt templates where there can be an associated prompt template for each question type. The main service 110 can insert at least some of the input query (or a rewritten input query) into the prompt template. The main service 110 can include the retrieved data objects (such as, but not limited to, items, item reviews, related questions, and/or question/answer pairs) and/or metadata for the retrieved data objects into the prompt template. The main service 110 can determine input data from context data. The main service 110 can insert context into the prompt template. As described herein, the context can include, but is not limited to, a user session, which can include a communication history (such as the current conversation history in the user interface 300), a navigation history, a current page, a current item (such as the user reviewing a particular item), item metadata (such as a title of an item), taxonomy information (such as item category, sub-category, etc.), and/or a user profile. The main service 110 can also limit the size of the prompt (such as a length of the prompt) to the trained generative model. In some embodiments, the main service 110 can determine input data, such as a prompt, based at least in part on the input query, the question type, and an item. The main service 110 can provide input data, such as the prompt, to the trained generative model.

At block 614, content can be received from the trained generative model (which can be referred to as a response generator model). The main service 110 can receive content in a stream from the trained generative model. The content can be a predicted response to the input data (such as an input prompt). The content can include tokens and some of the tokens can be intermediate tokens. For example, the content can include the text "ITEM-LIST:", which can be an intermediate token. Additional intermediate tokens, can include, but are not limited to, an aspect list token (which can be a placeholder for a list of factors, such as factors related to an item), a category or sub-category list token (which can be a placeholder for a list of categories or sub-categories), a comparison list token (which can be a placeholder for a list of items to compare), a related keywords list token (which can be a placeholder for a list of related keywords), and/or a related questions list token (which can be a placeholder for a list of related questions).

At block 616, content can be determined. A stream handler 416 can process the initial content. The stream handler 416 can determine, from the initial content, output content (such as markup content) in a data format different from the data format of the initial content. The data format of the output content can include, but is not limited to, a markup format or an object notation format. The stream handler 416 can replace, in the tokens, the intermediate token with content in the output data format (such as markup content in a markup format). For example, the stream handler 416 can replace the intermediate token "ITEM-LIST" with the output content "<section type='item-list' heading=' '>" in a markup format. The stream handler 416 can determine, from the initial content, output content. The stream handler 416 can replace, in the tokens, the intermediate token with data from the data object. The stream handler 416 can replace, in the tokens, the intermediate token with item metadata. The stream handler 416 can replace, in the tokens, the intermediate token with a related question. The stream handler 416 can replace, in the tokens, the intermediate token with an item review.

In some embodiments, the block 616 for processing can include blocks 618, 620, 622 for parsing the content, performing intermediate processing, and converting the content. At block 618, the content can be parsed. The parser 418 can parse the content. The parser 418 can receive the content and convert any intermediate tokens in the content. The parser 418 can include a dictionary to translate intermediate tokens to intermediate tags. The parser 418 can convert one or more tokens in the content (such as "ITEM-LIST:") into intermediate output (such as "[s type='item-list']"), which can include one or more intermediate tags and/or placeholder tokens. The parser 418 can insert, into intermediate content, a placeholder token. As an example, the parser 418 can convert an intermediate token for an item, such as "[b]A02939RMZC[e]", into intermediate output, such as "[s][item id='A02939RMZC']{TITLE_PLACE-HOLDER1}[/item]", which can include a placeholder token. Additional details regarding parsing content are described herein, such as with respect to FIGS. 5A-5B.

At block 620, intermediate processing can be performed. An intermediate processor 420 can process intermediate output. The intermediate processor 420 can perform additional tag and/or placeholder replacement. The intermediate processor 420 can convert the intermediate output (such as "[s type='item-list']") into modified intermediate output (such as "[s type='item-list' heading]". In some embodiments, the metadata associated with a data object can be retrieved at the retrieval source stage, such as at the previous block 610. The intermediate processor 420 can replace a placeholder token with metadata associated with data object, such as an item. The intermediate processor 420 can insert, at a placeholder location in the tokens, a title associated with an item. The intermediate processor 420 can insert, at a placeholder location in the tokens, a resource locator for an image associated with the item. The intermediate processor 420 can insert, at a placeholder location in the tokens, a related question. Additional details regarding intermediate processing are described herein, such as with respect to FIGS. 5A-5B.

In some embodiments, the intermediate processor 420 can check for flagged content. Certain topics or subject matter can be flagged in the content. Content can be flagged based at least in part on text matching, which can include fuzzy matching. For example, two strings can match if they are less than an edit threshold distance from one another. The intermediate processor 420 can use additional natural language processing techniques to detect certain topics or subject matter. The intermediate processor 420 can remove any flagged content from the intermediate output. The intermediate processor 420 can perform conversions, such as currency conversions or units of measurement conversions, based at least in part on the user profile associated with the input query.

In some embodiments, the intermediate processor 420 can check for one or more marker tokens. As used herein, the term "marker token" can refer to text data that is associated with additional post-processing logic. As described herein, a token can refer to text that a generative model reads or generates. A generative model can be trained to output marker tokens for certain question types. In some embodiments, marker tokens can be included in the final output that is transmitted to the user computing device 102. For example, if the input query includes a question, and the intermediate output includes "Yes the answer is Object1." In that case, the intermediate processor 420 can identify the marker token "Yes" and then everything following marker token and up until "Object1" can be suppressed and/or replaced. As described herein, the intermediate token for "Object1" can be replaced with metadata associated with the corresponding data object. Marker tokens can be any text, such as the text "No" in some cases. Accordingly, the intermediate processor 420 can identify, in the intermediate output tokens, a marker token and a second token following the marker token. The intermediate processor 420 can suppress one or more second tokens from being included in the output content. In some embodiments, the intermediate processor 420 can execute conditional logic based at least in part on the determined question type for the input query. In some embodiments, the generative model can be trained with prompt/response pairs that includes marker tokens, which can be used for additional post-processing logic.

At block 622, content can be converted. The converter 422 can convert intermediate output into the output content (such as markup content) in particular data format. The converter 422 can convert intermediate tags into final output. If the final output is markup content or JSON content, the converter 422 can convert the intermediate tags into valid markup or JSON. For example, the converter 422 can convert the modified intermediate output, such as "[s type='item-list' heading]"), into the output content, such as "<section type='item-list' heading='>". Additional examples can include the converter 422 can converting "[s][item id="A02939RMZC" ]ABZ Semiconductor [/item]" into "<section><item id='A02939RMZC'>ABZ Semiconductor </item>" or "[s][item id='A03ALIDEYW'] HLD Semiconductor [/item]" into "</section><section><item id='A03ALIDEYW'>HLD Semiconductor </item>". In the context of a markup format, output content can include "<section><item id='A02939RMZC'>ABZ Semiconductor </item>", which can include tags and attributes. Additional details regarding converting content are described herein, such as with respect to FIGS. 5A-5B.

At block 622, the output content can be transmitted to the user computing device 102. In some embodiments, the main service 110 and/or the orchestrator 120 can transmit the output content to the user computing device 102. As described herein, as the output content is determined, the AI system 104 can stream the determined content to the user computing device 102. In some embodiments, the AI system 104 and the user computing device 102 and/or the user facing system 150 can implement socket connection(s) to stream data. As described herein, the output content can be transmitted in response to receiving the input query.

At block 624, the content can be output in the user interface. The user computing device 102 (and/or the user facing system 150) can output the content. The user computing device 102 and/or user facing system 150 can determine when to output the content, since portions of the content may be streamed. For example, in a markup context, the user computing device 102 can output complete sections or portions of content that are renderable or that can be output in audio (such as complete sentences). Additional details regarding output of content in a user interface are described herein, such as with respect to FIGS. 3A-3E.

As shown, the method 600 can continue processing the content until the generative model completes generating content. At block 626, it can be determined whether there is additional content. The main service 110 can determine whether the generative model has more content to output. If yes, the method 600 returns to blocks 614, 616, 622 in a loop to receive the content, process the content, and transmit the content if there is any content to transmit. For example, the main service 110 can receive, in the stream from the trained generative model, second content. The main service 110 can transmit at least some of the second content to the user computing device 102 at a second time. Otherwise, there is no more content, and the method 600 can end.

While an electronic catalog is used as an example context for a chat or AI assistant, the systems and methods described herein can be applied to other contexts, such as, but not limited to, healthcare or any other context where users seek assistance, such as, customer service, Information Technology support.

Additional details and embodiments regarding generative model output hydration are provided in U.S. patent application Ser. No. 18/611,602, titled "GENERATIVE ARTIFICIAL INTELLIGENCE MODEL OUTPUT HYDRATION" (such as the embodiments provided in the claims sections), filed on Mar. 20, 2024, which is incorporated by reference herein in its entirety.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a non-transitory data storage medium to store specific computer-executable instructions; and
   a computer hardware processor in communication with the non-transitory data storage medium, wherein the computer hardware processor is to execute the specific computer-executable instructions to at least:
   receive an input query from a user computing device;
   determine a question type for the input query;
   determine a prompt based at least in part on the question type and the input query;
   provide the prompt to a trained generative model;
   receive, in a stream from the trained generative model, first content comprising a plurality of tokens, wherein a first token of the plurality of tokens is an intermediate token;
   determine first markup content from the first content, wherein to determine the first markup content, the computer hardware processor is to execute the computer-executable instructions to at least:
   replace, in the plurality of tokens, the intermediate token with markup content;
   transmit the first markup content to the user computing device at a first time;
   receive, in the stream from the trained generative model, second content; and
   transmit at least some of the second content to the user computing device at a second time.

2. The system of claim 1, wherein the computer hardware processor executes further computer-executable instructions to at least:
   determine an item associated with the input query, wherein to determine the prompt, the computer hardware processor is to execute the further computer-executable instructions to at least:
   insert the item into a prompt template.

3. The system of claim 2, wherein to determine the first markup content, the computer hardware processor is to execute additional computer-executable instructions to at least:
   insert, at a placeholder location in the plurality of tokens, a title associated with the item.

4. The system of claim 2, wherein to determine the first markup content, the computer hardware processor is to execute additional computer-executable instructions to at least:
   insert, at a placeholder location in the plurality of tokens, a resource locator for an image associated with the item.

5. The system of claim 1, wherein the computer hardware processor executes further computer-executable instructions to at least:
   determine a related question associated with the input query, wherein to determine the prompt, the computer hardware processor is to execute the further computer-executable instructions to at least:
   insert the related question into a prompt template.

6. The system of claim 5, wherein to determine the first markup content, the computer hardware processor is to execute additional computer-executable instructions to at least:
   insert, at a placeholder location in the plurality of tokens, the related question.

7. A computer-implemented method comprising:
receiving an input query from a user computing device;
determining a question type for the input query;
determining first input based at least in part on the question type and the input query;
providing the first input to a trained generative model;
receiving, in a stream from the trained generative model, first content comprising a plurality of tokens, wherein a first token of the plurality of tokens is an intermediate token;
determining, from the first content, first output content in a first data format different from a data format of the first content, wherein determining the first output content further comprises:
replacing, in the plurality of tokens, the intermediate token with content in the first data format;
transmitting the first output content to the user computing device at a first time;
receiving, in the stream from the trained generative model, second content; and
transmitting at least some of the second content to the user computing device at a second time.

8. The computer-implemented method of claim 7, further comprising:
retraining a pre-trained language model with machine learning and a training data set comprising a prompt and response pair, wherein the prompt and response pair comprises the intermediate token, wherein retraining the pre-trained language model further comprises:
outputting the trained generative model.

9. The computer-implemented method of claim 7, wherein determining the first input further comprises:
selecting a prompt template associated with the question type; and
inserting, into the prompt template, at least some of the input query.

10. The computer-implemented method of claim 7, further comprising:
determining an item associated with the input query, wherein determining the first output content further comprises:
inserting, into intermediate content, a placeholder token; and
replacing the placeholder token with metadata associated with the item.

11. The computer-implemented method of claim 10, wherein the metadata comprises a resource locator for the item.

12. The computer-implemented method of claim 7, further comprising:
determining a user profile associated with the input query; and
determining a communication history associated with the user profile, wherein determining the first input further comprises:
determining second input based at least in part on the communication history.

13. The computer-implemented method of claim 7, further comprising:
determining a user profile associated with the input query; and
determining a navigation history associated with the user profile, wherein determining the first input further comprises:
determining second input based at least in part on the navigation history.

14. A system comprising:
a non-transitory data storage medium to store specific computer-executable instructions; and
a computer hardware processor in communication with the non-transitory data storage medium, wherein the computer hardware processor is to execute the specific computer-executable instructions to at least:
receive an input query from a user computing device;
determine a question type for the input query;
determine first input based at least in part on the question type and the input query;
provide the first input to a trained generative model;
receive, in a stream from the trained generative model, first content comprising a plurality of tokens, wherein a first token of the plurality of tokens is an intermediate token;
determine, from the first content, first output content in a first data format different from a data format of the first content, wherein to determine the first output content, the computer hardware processor is to execute the computer-executable instructions to at least:
replace, in the plurality of tokens, the intermediate token with content in the first data format;
transmit the first output content to the user computing device at a first time;
receive, in the stream from the trained generative model, second content; and
transmit at least some of the second content to the user computing device at a second time.

15. The system of claim 14, wherein the first data format comprises a markup format or an object notation format.

16. The system of claim 14, wherein the computer hardware processor executes further computer-executable instructions to at least:
retrain a pre-trained language model with machine learning and a training data set comprising a prompt and response pair, wherein the prompt and response pair comprises the intermediate token, wherein to retrain the pre-trained language model, the computer hardware processor is to execute the further computer-executable instructions to at least:
output the trained generative model.

17. The system of claim 14, wherein the computer hardware processor executes further computer-executable instructions to at least:
determine an item associated with the input query, wherein to determine the first input, the computer hardware processor is to execute the further computer-executable instructions to at least:
determine second input based at least in part on the item.

18. The system of claim 17, wherein to determine the first output content, the computer hardware processor is to execute additional computer-executable instructions to at least:
insert, at a placeholder location in the plurality of tokens, a title associated with the item.

19. The system of claim 17, wherein to determine the first output content, the computer hardware processor is to execute further computer-executable instructions to at least:
insert, into intermediate content, a placeholder token; and
replace the placeholder token with metadata associated with the item.

20. The system of claim 14, wherein the computer hardware processor executes further computer-executable instructions to at least:
    determine a related question associated with the input query, wherein to generate the first output content, the computer hardware processor is to execute the further computer-executable instructions to at least:
    insert, at a placeholder location in the plurality of tokens, the related question.

* * * * *